US012024946B2

(12) United States Patent
Schulman

(10) Patent No.: US 12,024,946 B2
(45) Date of Patent: Jul. 2, 2024

(54) SHADE ADAPTER FOR A ROLLER SHADE

(71) Applicant: Levolor, Inc., Atlanta, GA (US)

(72) Inventor: Michael J. Schulman, Atlanta, GA (US)

(73) Assignee: Levolor, Inc., Atlanta, GA (US)

( * ) Notice: Subject to any disclaimer, the term of this patent is extended or adjusted under 35 U.S.C. 154(b) by 99 days.

(21) Appl. No.: 17/220,508

(22) Filed: Apr. 1, 2021

(65) Prior Publication Data

US 2021/0310300 A1 Oct. 7, 2021

Related U.S. Application Data

(60) Provisional application No. 63/005,570, filed on Apr. 6, 2020.

(51) Int. Cl.
*E06B 9/44* (2006.01)

(52) U.S. Cl.
CPC .................................... *E06B 9/44* (2013.01)

(58) Field of Classification Search
CPC ...... E06B 9/44; E06B 2009/2441; E06B 9/42; E06B 9/171; E06B 9/172; E06B 9/173; A47K 3/38; A47H 2201/01
See application file for complete search history.

(56) References Cited

U.S. PATENT DOCUMENTS 1,147,834 A 7/1915 Whitmore
1,620,159 A 3/1927 Levy
1,908,989 A 5/1933 Lahey et al.
2,351,373 A 6/1944 Thexton
4,317,480 A 3/1982 Phelops
5,099,906 A 3/1992 Chigusa et al.
5,732,419 A 3/1998 Feist
6,237,667 B1 * 5/2001 Fraczek .................... E06B 9/46
160/84.05

(Continued)

FOREIGN PATENT DOCUMENTS

CN 202148852 U 2/2012
CN 105464573 A 4/2016

(Continued)

OTHER PUBLICATIONS

Bloc Blinds, "Bloc Blinds Fabric Changer", YouTube, Mar. 2, 2015 (video length 01:53) https://www.youtube.com/watch?v=EuhiMq_U3YI.

(Continued)

*Primary Examiner* — Abe Massad
*Assistant Examiner* — Matthew R. Shepherd
(74) *Attorney, Agent, or Firm* — Dority & Manning P.A.

(57) ABSTRACT

In one aspect, a roller shade includes a roller and a shade panel configured to be wound around and unwound from the roller to retract and extend the shade panel, respectively. The roller shade further includes a shade adapter coupled between the roller and the shade panel. The shade adapter includes a first adapter portion configured to be coupled to the roller, a second adapter portion configured to be coupled to the shade panel, and a connector panel portion extending between the first and second adapter portions. The second adapter portion allows the shade panel to be quickly and easily removed from and installed relative to the shade adapter and, thus, the roller.

17 Claims, 11 Drawing Sheets

(56) References Cited

U.S. PATENT DOCUMENTS

| | | | | |
|---|---|---|---|---|
| 7,111,662 | B2 | 9/2006 | Lukos | |
| 7,114,545 | B2 * | 10/2006 | Null | E06B 9/266 160/173 R |
| 7,458,175 | B2 * | 12/2008 | Meyer | G09F 11/30 160/237 |
| 8,171,640 | B2 | 5/2012 | Colson et al. | |
| 8,490,672 | B2 | 7/2013 | Dieckmann | |
| 8,820,386 | B2 * | 9/2014 | Mullet | E06B 9/40 160/241 |
| 9,388,632 | B2 | 7/2016 | Strand | |
| 9,587,430 | B2 | 3/2017 | Colson et al. | |
| 9,683,407 | B2 | 6/2017 | Diamond | |
| 9,957,751 | B2 | 5/2018 | Van't Zelfde et al. | |
| 10,781,597 | B2 * | 9/2020 | Whittemore | E04G 21/26 |
| 2007/0277936 | A1 | 12/2007 | Sirkin | |
| 2008/0229491 | A1 * | 9/2008 | Gregory | A47K 3/38 4/558 |
| 2009/0031599 | A1 | 2/2009 | Ogikubo et al. | |
| 2011/0180219 | A1 * | 7/2011 | Pereira | E06B 9/42 160/405 |
| 2012/0012262 | A1 * | 1/2012 | Santoro | E06B 9/582 160/271 |
| 2013/0180666 | A1 | 7/2013 | Mullet et al. | |
| 2013/0306255 | A1 | 11/2013 | Ng | |
| 2016/0120352 | A1 | 5/2016 | Hsu et al. | |
| 2016/0123074 | A1 * | 5/2016 | Anderson | E06B 9/327 160/368.1 |
| 2016/0222721 | A1 * | 8/2016 | Rettig | E06B 9/262 |
| 2018/0106101 | A1 | 4/2018 | Holt et al. | |

FOREIGN PATENT DOCUMENTS

| | | | |
|---|---|---|---|
| CN | 206753444 | U | 12/2017 |
| DE | 12172499 | B | 7/1968 |
| DE | 2617279 | A1 | 11/1977 |
| DE | 3606554 | A1 | 9/1987 |
| DE | 19621655 | A1 | 12/1997 |
| DE | 10155167 | B4 | 9/2005 |
| DE | 202008011566 | U1 | 12/2008 |
| DE | 102004003067 | B4 | 12/2015 |
| DE | 102015101519 | A1 | 8/2016 |
| DE | 102018202806 | A1 | 8/2018 |
| EP | 0760045 | B1 | 7/1998 |
| EP | 0911479 | A2 | 4/1999 |
| EP | 0747561 | B1 | 8/2001 |
| EP | 1267031 | A1 | 12/2002 |
| EP | 1500774 | B1 | 3/2006 |
| EP | 1691028 | A1 | 8/2006 |
| EP | 1722066 | A1 | 11/2006 |
| EP | 1908915 | A2 | 4/2008 |
| EP | 2028337 | A1 | 2/2009 |
| EP | 2177708 | A2 | 4/2010 |
| EP | 2728102 | A1 | 5/2014 |
| EP | 2028338 | B1 | 7/2014 |
| FR | 2809095 | A1 | 11/2001 |
| FR | 3070713 | A1 | 3/2019 |
| JP | H1181827 | A | 3/1999 |
| JP | 2003208118 | A | 7/2002 |
| JP | 3784119 | B2 | 6/2006 |
| JP | 3840406 | B2 | 11/2006 |
| JP | 5283035 | B2 | 9/2013 |
| JP | 2016217124 | A | 12/2016 |
| JP | 6207141 | B2 | 10/2017 |
| KR | 101542597 | B1 | 8/2015 |
| KR | 20170009169 | A | 1/2017 |
| KR | 10763383 | B1 | 7/2017 |
| WO | WO2012128295 | A1 | 9/2012 |
| WO | WO2019158415 | A1 | 8/2019 |

OTHER PUBLICATIONS

Bloc Blinds, "Fabric Changer Roller Shade", Product information website. (2 pages) https://www.blocblinds.co.uk/fabric_changer_roller_shade.

* cited by examiner

SHADE ADAPTER FOR A ROLLER SHADE

CROSS-REFERENCE TO RELATED APPLICATIONS

The present application is based upon and claims the right of priority to U.S. Provisional Patent Application No. 63/005,570, filed Apr. 6, 2020, the disclosure of which is hereby incorporated by reference herein in its entirety for all purposes.

FIELD

The present subject matter relates generally to roller shades and, more particularly, to a shade adapter for a roller shade that allows for quick and efficient installation/removal of a shade panel relative to the associated roller, thereby allowing the roller shade to be provided with various different interchangeable shade panels.

BACKGROUND

Roller shades typically include a roller and a shade panel configured to be unwound from and wound around the roller to extend and retract the shade panel, respectively, relative to an adjacent architectural structure. In many instances, a weight or bottom rail may be coupled to the bottom end of the shade panel to maintain tension within the panel when it is at an extended position.

With continued use of the roller shade, the shade panel can often become dirty or faded. However, conventional roller shades are not adapted for removal of the shade panel for cleaning and/or for replacement of the shade panel with a new panel. As a result, consumers are typically required to replace the entire roller shade, which is often very costly. To address these issues, attempts have been made to design roller shades with replaceable shade panels. For instance, U.S. Pat. No. 9,683,407 (Diamond) discloses a roller shade including an intermediate screen or web that couples between the roller and the shade panel to allow the shade panel to be decoupled from the roller. While such disclosures provides a means for allowing removal or replacement of a shade panel, further improvements and refinements are needed to satisfy market and consumer demands.

Accordingly, an improved roller shade that incorporates a shade adapter for quick and efficient installation/removal of a shade panel relative to an associated roller of the roller shade would be welcomed in the technology.

BRIEF SUMMARY

Aspects and advantages of the present subject matter will be set forth in part in the following description, or may be obvious from the description, or may be learned through practice of the present subject matter.

In one aspect, the present subject matter is directed to a roller shade including a roller and a shade panel configured to be wound around and unwound from the roller to retract and extend the shade panel, respectively. The roller shade further includes a shade adapter coupled between the roller and the shade panel. The shade adapter includes a first adapter portion configured to be coupled to the roller and a second adapter portion configured to be coupled to the shade panel, with the second adapter portion including a first magnetic element coupled thereto. The shade adapter further includes a connector panel portion extending between the first and second adapter portions. Moreover, the roller shade includes a second magnetic element is coupled to a portion of the shade panel, with the first and second magnetic elements configured to be magnetically engaged with each other to couple the shade adapter to the shade panel.

In another aspect, the present subject matter is directed to a roller shade including a roller and a shade panel configured to be wound around and unwound from the roller to retract and extend the shade panel, respectively. The roller shade further includes a shade adapter coupled between the roller and the shade panel. The shade adapter includes a first adapter portion configured to be coupled to the roller at a joint location, a second adapter portion configured to be coupled to the shade panel, and a connector panel portion extending between the first and second adapter portions. The first adapter portion includes a curved extension arm extending from the joint location in a direction opposite an interface defined between the first adapter portion and the connector panel portion such that the curved extension arm extends circumferentially around a portion of the roller.

These and other features, aspects, and advantages of the present subject matter will become better understood with reference to the following Detailed Description and appended claims. The accompanying drawings, which are incorporated in and constitute a part of this specification, illustrate embodiments of the present subject matter and, together with the description, serve to explain the principles of the present subject matter.

This Brief Description is provided to introduce a selection of concepts in a simplified form that are further described below in the Detailed Description. This Brief Description is not intended to identify key features or essential features of the claimed subject matter, nor is it intended as an aid in determining the scope of the claimed subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Figure 1:
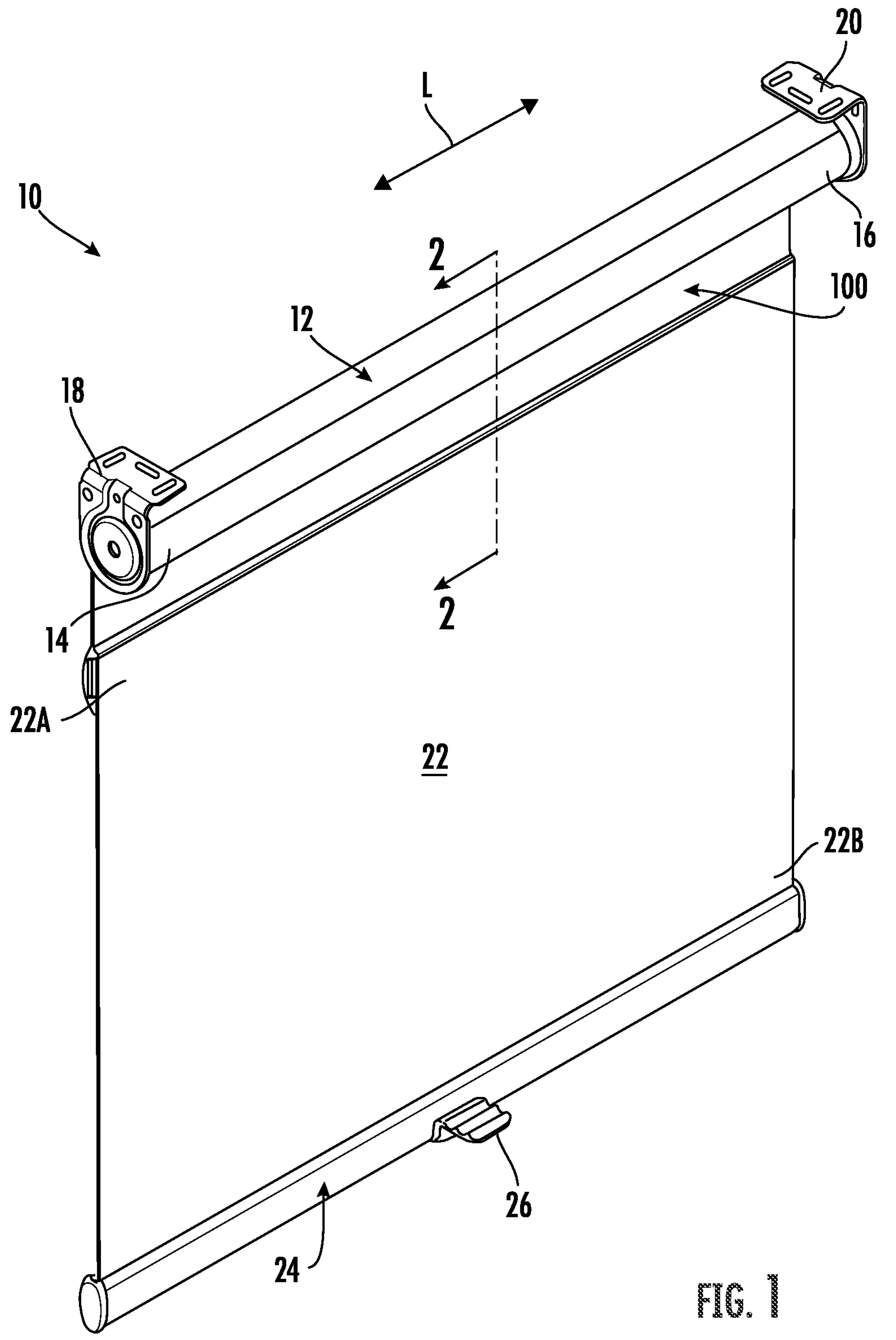
FIG. 1 illustrates a perspective view one embodiment of a roller shade in accordance with aspects of the present subject matter.

In general, the present subject matter is directed to a roller shade for covering an architectural feature or structure (referred to herein simply as an architectural "structure" for the sake of convenience and without intent to limit). In several embodiments, the roller shade includes a roller and a shade panel coupled to the roller. The shade panel is configured to be wound around and unwound from the roller to retract and extend the shade panel, respectively, relative to an adjacent architectural structure.

Additionally, in accordance with aspects of the present subject matter, the roller shade incudes a shade adapter configured to be coupled between the roller and the shade panel, thereby providing a coupling or connection between such components. In several embodiments, the shade adapter includes a first adapter portion configured to be coupled to the roller, a second adapter portion configured to be coupled to the shade panel, and a connector panel portion extending between the first and second adapter portions. The second adapter portion may be configured to allow the shade panel to be quickly and easily removed from and installed relative to the shade adapter. As a result, the shade adapter may facilitate hassle-free removal of the shade panel to permit, for instance, the shade panel to be cleaned or replaced with a new shade panel.

In several embodiments, the shade panel is configured to be coupled to the shade adapter via a magnetic connection. For instance, the second adapter portion of the shade adapter may include at least one first magnetic element coupled thereto that is configured to magnetically engage a corresponding second magnetic element(s) coupled to a portion of the shade panel, such as an upper end of the shade panel. In such an embodiment, by positioning the upper end of the shade panel adjacent to or in close proximity of the second adapter portion of the shade adapter, the first and second magnetic elements may magnetically engage each other, thereby coupling the shade panel to the shade adapter.

Moreover, in several embodiments, the second adapter portion may define a retention channel within which the first magnetic element(s) is received. In one embodiment, a depth or height of the retention channel may be selected such that, when the first and second magnetic elements are magnetically engaged with each other, the second magnetic element(s) is also at least partially received within the retention channel. As a result, the retention channel may function as a self-locating or alignment feature for coupling the shade panel to the shade adapter. Specifically, by configuring the second magnetic element(s) to be at least partially received within the retention channel with the magnetic coupling the magnetic elements, it can be ensured that the shade panel is properly and consistently aligned with the shade adapter (e.g., in the vertical direction of the roller shade) each and every time the shade panel is installed relative to the shade adapter (or when a new shade panel is installed relative to the shade adapter).

Additionally, in one embodiment, the shade adapter and shade panel may also include corresponding lateral alignment features for aligning the shade panel relative to the shade adapter in a lateral direction of the roller shade. For instance, in one embodiment, the shade panel and/or its associated magnetic element(s) (e.g., the second magnetic element) may include or define one or more alignment slots or keyways (e.g., at the upper end of the shade panel) that is/are configured to receive one or more corresponding raised features or keys provided in association with the second adapter portion of the shade adapter, such as a key(s) extending outwardly from the first magnetic element(s) within the retention channel. In such an embodiment, by aligning the keyway associated with the shade panel with the key of the shade adapter when coupling the shade panel to the shade adapter via the magnetic elements such that the key is received within the keyway, it can be ensured that the shade panel is properly and consistently aligned with the shade adapter (i.e., in the lateral direction of the roller shade) each and every time the shade panel is installed relative to the shade adapter (or when a new shade panel is installed relative to the shade adapter).

In another embodiment, the shade panel is configured to be coupled to the shade adapter via a dovetail-type joint. For instance, the second adapter portion of the shade adapter may define a diverging joint slot configured to receive a correspondingly shaped shade connector coupled to a portion of the shade panel, such as an upper end of the shade panel. In such an embodiment, the shade panel may be configured to be installed relative to the shade adapter, for instance, by inserting the shade connector within the joint slot and by sliding the shade panel relative to the shade adapter across the width of the adapter.

Additionally, in several embodiments, the shade adapter is configured to be wrapped around the roller in a manner such that an outer perimeter of the wrapped shade adapter defines a generally circular profile. For instance, in one embodiment, the roller is configured to define a generally circular profile, with the exception of a flattened roller section that is recessed relative to the otherwise circular profile. Moreover, with the first adapter portion coupled to the roller at a joint location, the shade adapter may be configured to wrap around the roller such that the second adapter portion is circumferentially aligned with the flattened section of the roller. In such an embodiment, an outer face of the second adapter portion may be configured to define a curve profile that generally matches the curved profile of the remainder of the shade adapter as wrapped around the roller.

Moreover, in several embodiments, the first adapter portion of the shade adapter includes an extension arm configured to extend circumferentially around the roller between the roller/adapter joint location (e.g., as defined between the roller and the first adapter portion) and the flattened section of the roller. Specifically, in one embodiment, the extension arm may be configured to extend circumferentially around the roller such that a tip end of the extension arm is positioned adjacent to the flattened roller section. In such an embodiment, with the shade adapter wrapped around the roller, the tip end of the extension arm may be positioned adjacent to an end of the second adapter portion so that the shade adapter wraps end-to-end substantially entirely around the roller. Additionally, in one embodiment, an outer face of the first adapter portion defines a curved profile that generally matches a curved profile of the second adapter portion such that the first and second adapter portions collectively define a common curved profile that extends across the adjacent ends of the adapter portions.

It should be understood that, as described herein, an "embodiment" (such as illustrated in the accompanying Figures) may refer to an illustrative representation of an environment or article or component in which a disclosed concept or feature may be provided or embodied, or to the representation of a manner in which just the concept or feature may be provided or embodied. However, such illustrated embodiments are to be understood as examples (unless otherwise stated), and other manners of embodying the described concepts or features, such as may be understood by one of ordinary skill in the art upon learning the concepts or features from the present disclosure, are within the scope of the disclosure. In addition, it will be appreciated that while the Figures may show one or more embodiments of concepts or features together in a single embodiment of an environment, article, or component incorporating such concepts or features, such concepts or features are to be understood (unless otherwise specified) as independent of and separate from one another and are shown together for the sake of convenience and without intent to limit to being present or used together. For instance, features illustrated or described as part of one embodiment can be used separately, or with another embodiment to yield a still further embodiment. Thus, it is intended that the present subject matter covers such modifications and variations as come within the scope of the appended claims and their equivalents.

Referring now to drawings, FIG. 1 illustrates a perspective view of an example embodiment of a roller shade 10 in accordance with aspects of the present subject matter. In general, the roller shade 10 may be configured to be installed relative to a window, door, or any other suitable architectural structure (not shown) as may be desired. For instance, in one embodiment, the roller shade 10 may be configured to be mounted relative to an architectural structure to allow the shade 10 to be suspended or supported relative to the architectural structure. It should be understood that the roller shade 10 is not limited in its particular use as a window or door shade, and may be used in any application as a covering, partition, shade, and/or the like, relative to and/or within any type of architectural structure.

As shown in the illustrated embodiment, the roller shade 10 includes a roller shaft or tube 12 (referred to herein simply as "roller" for the sake of simplicity and without intent to limit) configured to be supported for rotation relative to an adjacent architectural structure. For instance, in the illustrated embodiment, the roller 12 generally extends in a longitudinal or lateral direction of the roller shade 10 (as indicated by arrow L in FIG. 1) between a first end 14 and a second end 16, with each end 14, 16 of the roller 12 being rotatably coupled to a respective mounting bracket 18, 20 for supporting the roller shade 10 relative to the adjacent architectural structure. The roller shade 10 also includes a flexible shade panel 22 configured to be unwound from and wound around the roller 12 with rotation thereof to allow the shade panel 22 to be extended and retracted relative to the adjacent architectural structure. Specifically, with rotation of the roller 12 in a first or extension direction, the shade panel 22 may be unwound from the roller 12 to allow the panel 22 to be extended and, thus, cover or at least partially cover the adjacent architectural structure. Similarly, with rotation of the roller 12 in an opposed, second or retraction direction, the shade panel 22 may be wound around the roller 12 to allow the panel 22 to be retracted relative to the adjacent architectural structure.

Additionally, as shown in FIG. 1, the roller shade 10 may also include a bottom bar or rail 24 coupled to a lower or bottom end 22B of the shade panel 22. The bottom rail 24 may be used to provide additional weight to the shade panel 22, thereby maintaining tension in the shade panel 22 while the panel 22 is extended. As shown in the illustrated embodiment, the bottom rail 24 may optionally include a handle 26 to allow a user to manually grasp the bottom rail 24 for raising and lowering the shade panel 22. For instance, when the roller shade 10 includes a spring-assisted operating system (not shown) housed within the roller 12, the bottom rail 24 may be pulled downward slightly (e.g., via the handle 26) to unlock the operating system, which may then allow the operating system to automatically rotate the roller 12 to raise or retract the shade panel 22 via the energy stored within the associated roller spring or spring motor (not shown). It should be appreciated that, as an alternative to a spring-assisted operating system, the roller shade 10 may include any other suitable type of operating system, such as a motorized operating system or a cord loop operating system.

Moreover, in accordance with aspects of the present subject matter, the roller shade 10 further includes a shade adapter 100 configured to be coupled between the roller 12 and the shade panel 22. Specifically, the shade adapter 100 may include a first end or adapter portion configured to be coupled to the roller 12 and a second end or adapter portion configured to be coupled to an upper end 22A of the shade panel 22. As will be described below, the coupling or connection provided between the shade adapter 100 and the shade panel 22 may facilitate hassle-free installation and removal of the shade panel 22 relative to the adapter 100. As a result, the shade panel 22 may be quickly and easily removed, as desired, to allow the panel 22 to be cleaned and/or replaced with a new shade panel.

It should be appreciated that, in the illustrated embodiment, the shade panel 22 is shown in an overextended position at which the shade adapter 100 is completely unwound relative to the roller 12 to illustrate the adapter 100 in its fully unwrapped state, as well as the connection between the adapter 100 and the shade panel 22. However, during normal operation of the roller shade 10, the shade adapter 100 will typically remain at least partially wrapped around the roller 12 such that the connection between adapter 100 and the shade panel 22 is not visible to a user of the shade 10 (or is at least partially hidden or concealed from the user). It should also be appreciated that, although not shown, the roller shade 10 may also include a headrail within which the roller 12 is housed to conceal the roller 12 (and potentially the connection the between adapter 100 and the shade panel 22).

Figure 2:
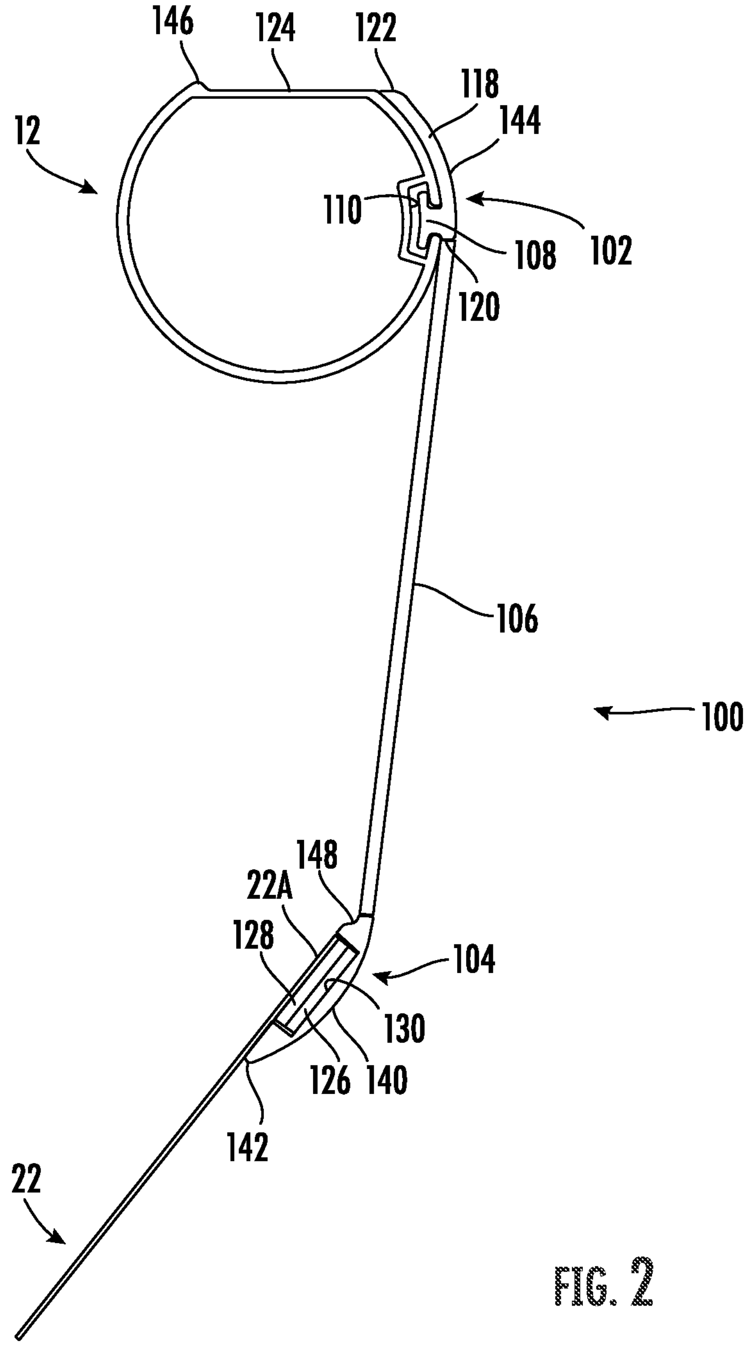
FIG. 2 illustrates a partial, cross-sectional view of the roller shade shown in FIG. 1 taken about line 2-2, particularly illustrating one embodiment of a shade adapter for coupling a shade panel of the roller shade to a roller of the roller shade in accordance with aspects of the present subject matter.
Figure 3:
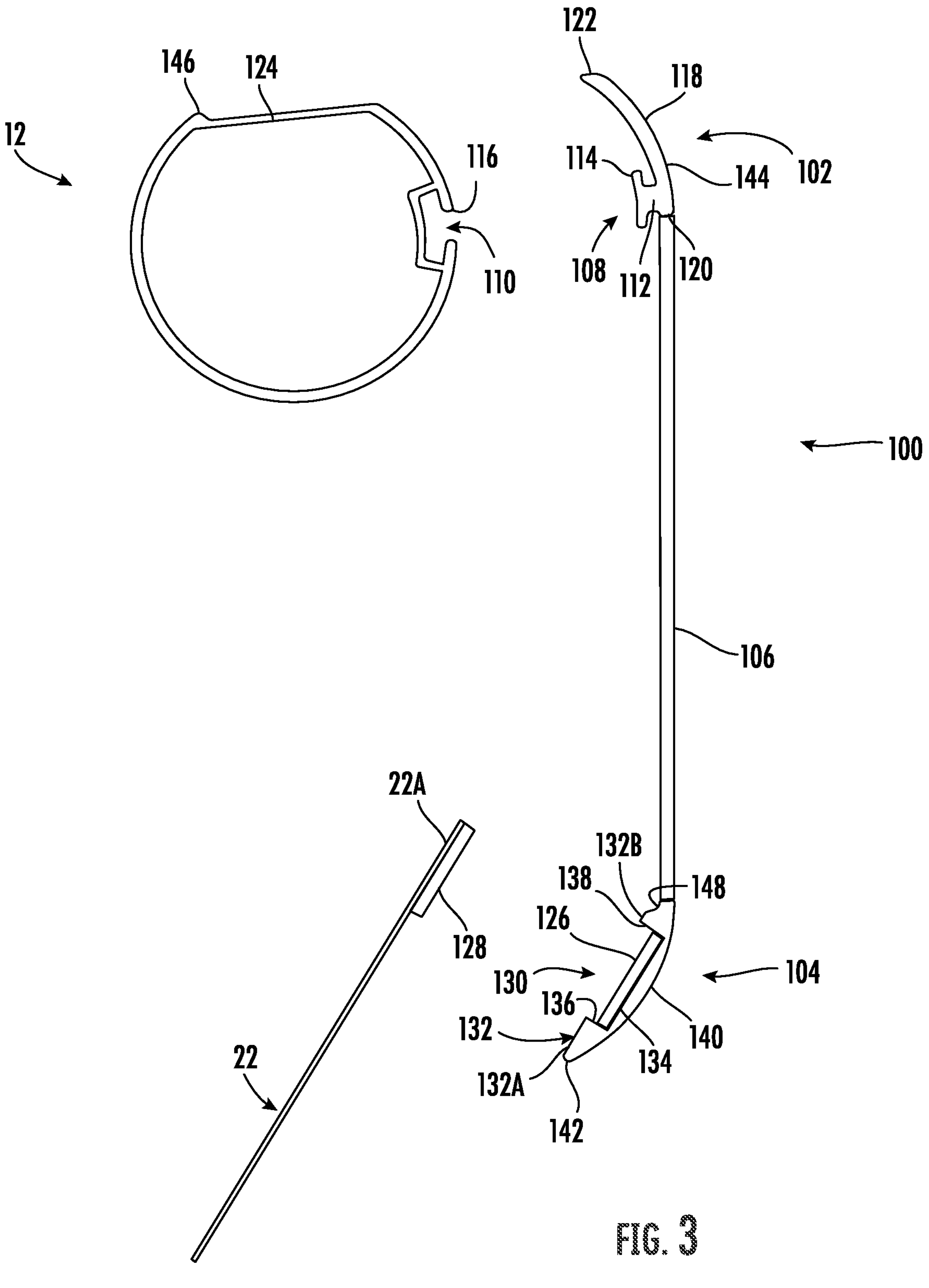
FIG. 3 illustrates an exploded view of the shade components shown in FIG. 2.

Referring now to FIGS. 2 and 3, partial, cross-sectional views of the roller shade 10 shown in FIG. 1 are illustrated in accordance with aspects of the present subject matter, particularly illustrating one example embodiment of the shade adapter 100 described above. Specifically, FIG. 2 illustrates a cross-sectional view of the roller shade 10 shown in FIG. 1 taken about line 2-2, with the shade adapter 100 shown in a fully unwrapped state relative to the roller 12. Additionally, FIG. 3 illustrates an exploded view of the various components of the roller shade 10 shown in FIG. 2.

As shown in FIGS. 2 and 3, the shade adapter 100 is configured as an elongate member including a first adapter portion 102 at one end of the adapter 100, a second adapter portion 104 at an opposed end of the adapter 100, and a connector panel portion 106 extending between the first and second adapter portions 102, 104. In general, the first adapter portion 102 is configured to be coupled to a portion the roller 12 of the roller shade 10, while the second adapter portion 104 is configured to be coupled to the upper end 22A of the shade panel 22 of the roller shade 10. As such, the shade adapter 100 may function to connect or couple the shade panel 22 to the roller 12 and may be configured to be wound around or unwound from the roller 12 with rotation thereof in a similar manner as the shade panel 22. For instance, as will be described below with reference to FIG. 5, the connector panel portion 106 may be configured to be wrapped around the roller 12 as the roller 12 is being rotated in the retraction direction.

Figure 4:
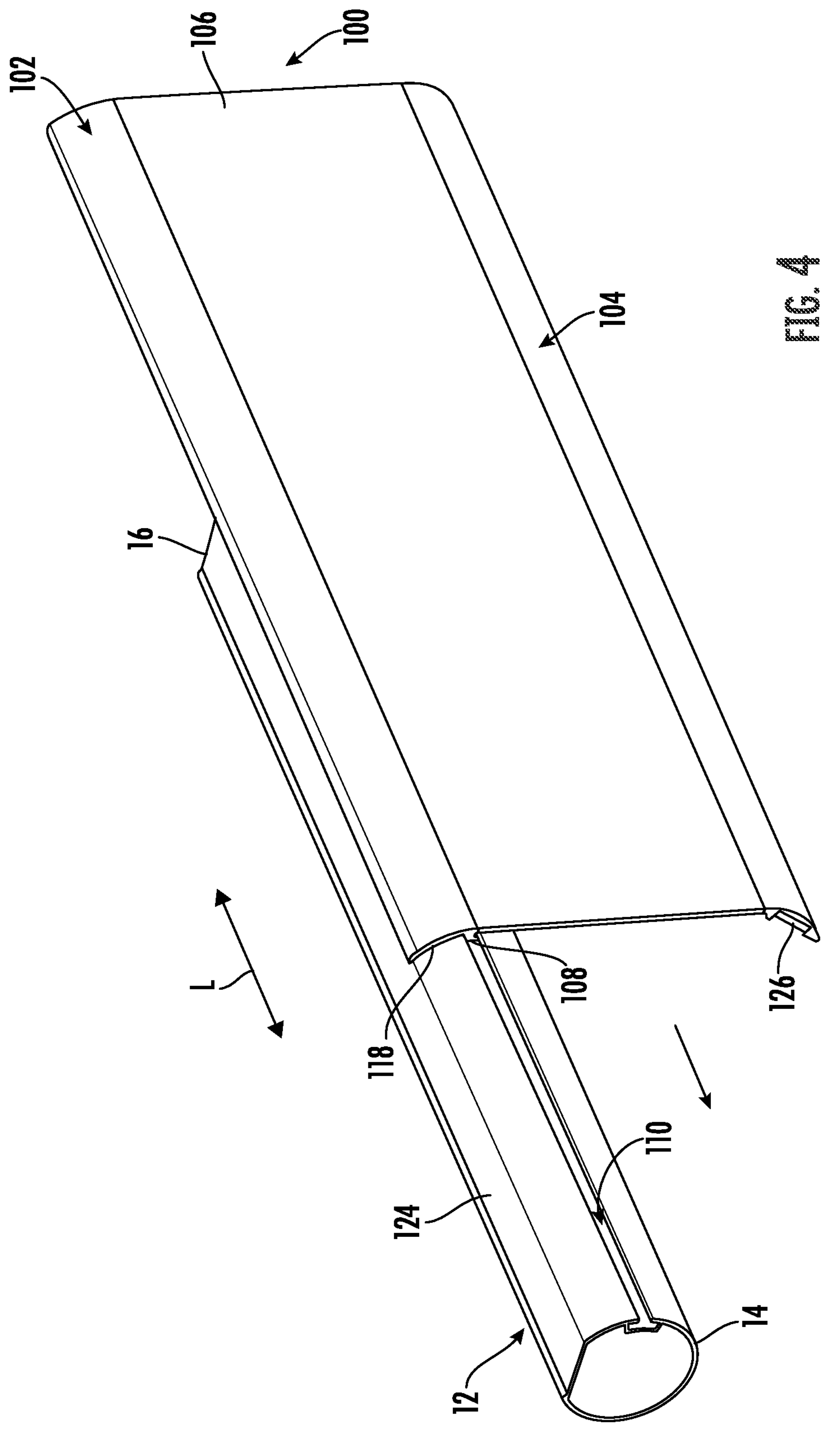
FIG. 4 illustrates a perspective view of the roller and shade adapter shown in FIG. 2, with the shade adapter in a partially assembled state relative to the roller.

In several embodiments, the first adapter portion 102 is configured to form a dovetail-type joint with the roller 12. Specifically, as shown in the illustrated embodiment, the first adapter portion 102 includes a joint projection 108 configured to be received within a corresponding joint slot 110 defined by the roller 12 to secure the shade adapter 100 to the roller 12. In one embodiment, the joint projection 108 and/or the joint slot 110 may be shaped, sized, and/or otherwise configured such that the joint projection 108 is adapted to be slidably received within the joint slot 110. For instance, as particularly shown in FIG. 3, the joint projection 108 is configured as a T-shaped projection including a narrow neck 112 and an enlarged head 114. In such an embodiment, the joint slot 110 may be formed with an opening 116 (FIG. 3) that is smaller in dimension than the enlarged head 114 of the joint projection 108, thereby requiring the joint projection 108 to be slidably inserted within the joint slot 110 at one of the longitudinal ends 14, 16 (FIG. 1) of the roller 12. Specifically, in the illustrated embodiment, the joint projection 108 may be inserted into the joint slot 110 at either the first end 14 or the second end 16 of the roller 12 and then slid longitudinally in the lateral direction L of the roller shade 10 until the shade adapter 100 extends end-to-end along the length of the roller 12. For instance, FIG. 4 illustrates a perspective view of the roller 12 and the shade adapter 100, with the adapter 100 in a partially assembled state relative to the roller 12. As shown, the joint projection 108 has been inserted into the joint slot 110 at the second end 16 of the roller 12 such that the shade adapter 100 must be slid in the lateral direction L relative to the roller 12 until the shade adapter 100 reaches the opposed first end 14 of the roller 12.

Additionally, in several embodiments, the first adapter portion 102 may also include a curved extension arm 118 configured to wrap circumferentially around a portion of the roller 12 when the joint projection 108 is received within the joint slot 110 of the roller 12. Specifically, as shown in FIG. 2, the extension arm 118 extends outwardly from the joint projection 108 in a direction opposite an interface 120 defined between the adapter portion 102 and the connector panel portion 106 of the shade adapter 100 to a tip end 122 of the first adapter portion 102. In such an embodiment, the extension arm 118 may generally be configured to define a radius of curvature between the joint projection 108 and the tip end 122 of the first adapter portion 102 that matches or substantially matches the radius of curvature of the roller 12. Thus, with the joint projection 108 installed within the joint slot 110, the extension arm 118 may be configured to wrap around and be seated flush against an adjacent circumferential portion of the roller 12. For instance, as shown in FIG. 2, the extension arm 118 is generally configured to wrap circumferentially around the roller 12 from the joint slot 110 to a flattened section 124 of the roller 12. As will be described below, such circumferential wrapping of the extension arm 118 around the roller 12 may assist the shade adapter 100 in forming a generally circular profile when the adapter 100 is fully wrapped around the roller 12.

As indicated above, the second adapter portion 104 is generally configured to be coupled to the upper end 22A of the shade panel 22 of the roller shade 10. In several embodiments, such coupling between the shade adapter 100 and the shade panel 22 may be achieved using one or more magnetic elements to provide a magnetic connection between the components For example, as shown in the illustrated embodiment, one or more first magnetic elements 126 may be coupled to or otherwise provided in operative association with the second adapter portion 104, while one or more second magnetic elements 128 may be coupled to or otherwise provided in operative association with the upper end 22A of the shade panel 22. Thus, by placing the magnetic elements 126, 128 in close proximity, such elements 126, 128 may magnetically engage each other, thereby coupling or securing the shade panel 22 to the shade adapter 100.

It should be appreciated that, as used herein, the term "magnetic element" refers to either a magnet or a component formed from a magnet-attracting or magnet-engaging material, such as a ferromagnetic material (e.g., iron). Thus, to form the magnetic connection between the first and second magnetic elements 126, 128, at least one of such magnetic elements must be a magnet. For instance, in one embodiment, both the first magnetic element(s) 126 and the second magnetic element(s) 126 are magnets. Alternatively, one of the first magnetic element(s) 126 or the second magnetic element(s) 128 may be a magnet, while the other of such magnetic elements 126, 128 may be a strip or block of magnet-attracting or magnet-engaging material, such as an elongated steel or iron-based striker plate(s). It should also be appreciated that the above-described magnetic connection may be achieved using a single elongated element for each magnetic element 126, 128. For instance, each magnetic element 126, 128 may, in one embodiment, correspond to a magnetic strip (e.g., formed by a magnetic or magnet-attracting or magnet-engaging material) that extends substantially across the entire width of the shade adapter 100 and/or the shade panel 22. Alternatively, a plurality of spaced apart first and second magnetic elements 126, 128 may be used, with each first magnetic element 126 configured to be aligned with a corresponding second magnetic element 128 when the shade panel 22 is properly installed relative to the shade adapter 100.

In several embodiments, the second adapter portion 104 may define a retention channel 130 for receiving the first magnetic element(s) 126. In one embodiment, the retention channel 130 may extend longitudinally in lateral direction L along the entire width of the shade adapter 100. As particularly shown in FIG. 3, in one embodiment, the retention channel 130 may defined relative to an inner face 132 of the second adapter portion 104 such that a bottom end 134 of the channel 130 is recessed relative to the inner face 132 of the second adapter portion 104. For instance, the retention channel 130 may include first and second sidewalls 136, 138 extending inwardly from the inner face 132 of the second adapter portion 104 to the bottom end 134 of channel 130 such that the bottom end 134 is recessed relative to the inner face 132 by a distance equal to the height of the sidewalls 136, 138. In such an embodiment, the first magnetic element(s) 126 may be positioned or secured within the retention channel 130 between the opposed sidewalls 136, 138. For instance, the first magnetic element(s) 126 may be secured within the retention channel 130 (e.g., via a suitable adhesive or tape) such that the magnet element(s) 126 is seated flush against the bottom end 134 of the channel 130. In such an embodiment, when the first magnetic element(s) 126 is configured as an elongated magnetic strip, the magnetic element(s) 126 may extend within the retention channel 130 (e.g., along its bottom end 134) along all or substantially all of the width of the second adapter portion 104. Alternatively, when two or more first magnetic elements 126 are provided in operative association with the second adapter portion 104, the magnetic elements 126 may, for example, by spaced apart from one another along the length of the retention channel 130.

Additionally, in one embodiment, the depth of the retention channel 130 (e.g., as defined by the height of the sidewalls 136, 138) may be selected such that the first magnetic element(s) 126 is recessed within the retention channel 130 relative to the inner face 132 of the second adapter portion 104. In such an embodiment, the retention channel 130 may also be configured to receive at least a portion of the second magnetic element(s) 128 when the magnetic elements 126, 128 are magnetically engaged with each other. For instance, as shown in FIG. 2, the depth of the retention channel 130 may be selected such that all or substantially all of the second magnetic element(s) 128 is received within the retention channel 130 when the magnetic elements 126, 128 are magnetically engaged. As a result, the retention channel 130 may function as a self-locating or alignment feature that facilitates proper alignment of the shade panel 22 relative to the shade adapter 100. Specifically, by capturing the second magnetic element(s) 128 between the sidewalls 136, 138 of the retention channel 130, proper and consistent alignment of the shade panel 22 can be achieved each and every time the shade panel 22 is installed relative to the shade adapter 100. Similarly, by configuring replacement shade panels to include the same or a similar second magnetic element(s) 128 coupled to their upper panel ends, such replacement panels may be quickly and easily installed relative to the shade adapter 100 by simply aligning the second magnetic element(s) with the second adapter portion 104 so that the second magnetic element(s) is received within the retention channel 130 as the magnetic elements magnetically engage each other.

It should be appreciated that, in one embodiment, the first and second adapter portions 102, 104 may correspond to rigid or semi-rigid elements of the shade adapter 100, while the connector panel portion 106 may correspond to a flexible element of the shade adapter 100 (thereby allowing the connector panel portion 106 to conform to the radius of curvature of the roller 12 as the shade adapter 100 is wrapped around the roller 12, as will be described below). In such an embodiment, the shade adapter 100 may, for example, be formed integrally as an extruded component, such as by using a co-extrusion or multi-material extrusion process. For instance, the shade adapter 100 may be extruded or formed using polyvinyl chloride (PVC) materials, with the first and second adapter portions 102, 104 being formed from a rigid or semi-rigid PVC material and the connector panel portion 106 being formed from a flexible PVC material. However, in other embodiments, the shade adapter 100 may be formed using any other suitable process and/or any other suitable materials. For instance, in an alternative embodiment, each of the first adapter portion 102, the second adapter portion 104, and the connector panel portion 106 of the shade adapter 100 may be formed as a separate component, with such components then being assembled together to form the shade adapter 100.

Figure 5:
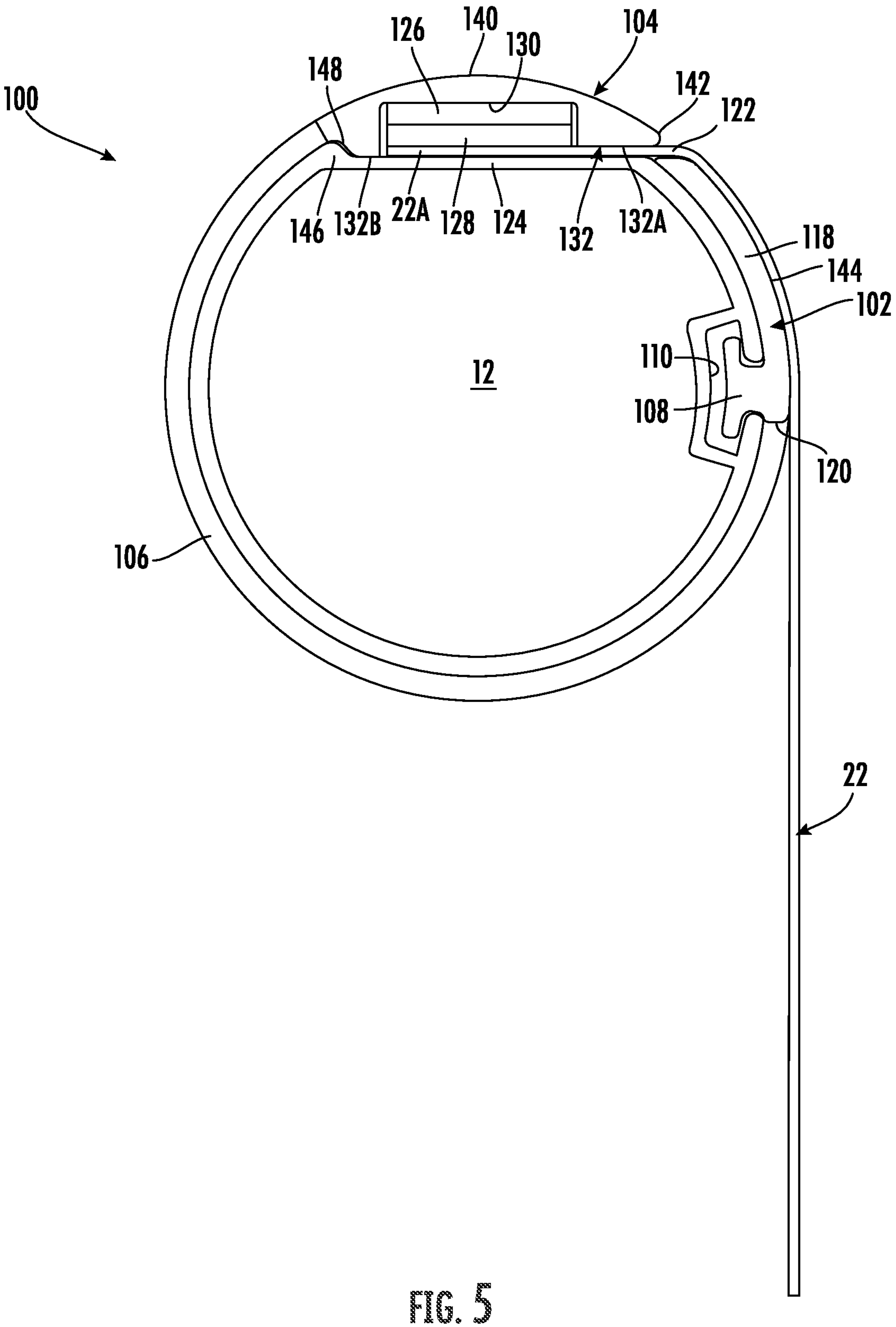
FIG. 5 illustrates another cross-sectional view of the assembled shade components shown in FIG. 2, particularly illustrating the shade adapter in a fully wrapped state relative to the roller.

Referring now to FIG. 5, another cross-sectional view of the components shown in FIG. 2 is illustrated in accordance with aspects of the present subject matter, particularly illustrating the shade adapter 100 after it has been fully wrapped around the roller 12. As shown, the shade adapter 100 is configured to form a generally circular profile when wrapped around the roller 12, thereby allowing the shade panel 22 to be wrapped around both the shade adapter 100 and the roller 12 as the panel 22 is being retracted without creating indentions or other dents in the wrapped panel that can lead to defects in the fabric over time.

As indicated above, the roller 12 may be configured to include a flattened roller section 124 that is spaced apart circumferentially from the joint slot 110 of the roller 12. For instance, with brief reference to the isolated view of the roller 12 shown in FIG. 3, the roller 12 generally defines a circular cross-sectional profile, with only a small circumferential region of the roller 12 being flattened or otherwise recessed relative to the generally circular profile to form the flattened roller section 124. In such an embodiment, the flattened roller section 124 may generally be configured to be circumferentially aligned with the second adapter portion 104 of the shade adapter 100 when the adapter 100 is wrapped around the roller 12. For instance, referring back to FIG. 5, the length of the connector panel portion 106 of the shade adapter 100 may be selected such that, when the shade adapter 100 is wrapped around the roller 12, the inner face 132 of the second adapter portion 104 is seated flushed against or otherwise positioned adjacent to the flattened section 124 of the roller 12.

Additionally, as shown in FIG. 5, an opposed outer face 140 of the second adapter portion 104 defines a curved profile that generally matches the radius of curvature or curved profile of the remainder of the outer perimeter of the shade adapter 100 as wrapped around the roller 12. In other words, the outer face 140 of the second adapter portion 104 may generally form a continuation of the curved profile that is otherwise formed by the connector panel portion 106 of the shade adapter 100 as it wraps around the roller 12 from the location of the roller/adapter joint formed between the roller 12 and the first adapter portion 102 of the shade adapter 100. Moreover, as shown in FIG. 5, by configuring the extension arm 118 of the first adapter portion 102 to extend circumferentially between the roller/adapter joint and the flattened section 124 of the roller 12, the shade adapter 100 may generally wrap end-to-end substantially entirely around the outer perimeter of the roller 12. Specifically, as shown in the illustrated embodiment, the tip end 122 of the extension arm 118 extends up to and is positioned generally adjacent to a tip end 142 of the second adapter portion 104 disposed at the edge of the flattened section 124 of the roller 12, with only a small gap being defined between such tip ends 122, 142 for allowing the shade panel 22 to pass between the adapter portions 102, 104. With such a configuration, an outer face 144 of the first adapter portion 102 may generally form a continuation of the curved profile defined by the outer face 140 of the second adapter portion 104. In particular, the outer face 144 of the first adapter portion 102 may define a curved profile that generally matches the curved profile of the outer face 140 of the second adapter portion 104 such that the first and second adapter portions 102, 104 collectively define a common or continuous curved profile that extends across the adjacent ends 122, 142 of the adapter portions 102, 104. As a result, when wrapped fully around the roller 12, the shade adapter 100 may define a generally continuous, circular cross-sectional profile, thereby allowing the shade panel 22 to be subsequently wrapped around the roller 12 over-top of the adapter 100 without the potential for creating indentations, dents, creases, or other defects within the fabric over time.

It should be appreciated that, in one embodiment, the inner face 132 of the second adapter portion 104 may be defined by separate face sections 132A, 132B positioned along opposed sides of the retention channel 130. For instance, as shown in FIG. 5, the inner face 132 may be defined by a first face section 132A extending between the retention channel 130 and the tip end 142 of the second adapter portion 104 and a second face section 132B extending along the opposed side of the retention channel 130. In several embodiments, the first and second face sections 132A, 132B may be offset from one another or otherwise not co-planar. For instance, as shown in the illustrated embodiment, the second face section 132B is spaced apart further from the bottom wall 134 (FIG. 3) of the retention channel 130 than the first face section 132A. In such an embodiment, as shown in FIG. 5, the second face section 132B may abut against or otherwise directly contact the flattened section 124 of the roller 12, while the first face section 132A may be spaced apart slightly from the flattened section 124 (e.g., by a distance generally equal to the thickness of the shade panel 22) to allow the shade panel 22 to extend between the first face section 132A and the flattened section 124.

It should also be appreciated that, in one embodiment, the roller 12 and/or the second adapter portion 104 may include a locating feature that assists in ensuring that the second adapter portion 104 properly aligns or mates with the flattened portion 124 of the roller 12 as the shade adapter 100 is being wrapped around the roller 12. For instance, as shown in FIG. 5, the roller 12 includes a small projection or detent 146 formed at a transition location at which the circular profile of the roller 12 transitions into the flattened roller section 124. In such an embodiment, the second adapter portion 104 may include a similarly shaped feature (e.g., recess 148) that is configured to engage or mate with the detent 146 when the shade adapter 100 is properly wrapped around the roller 12.

Figure 6:
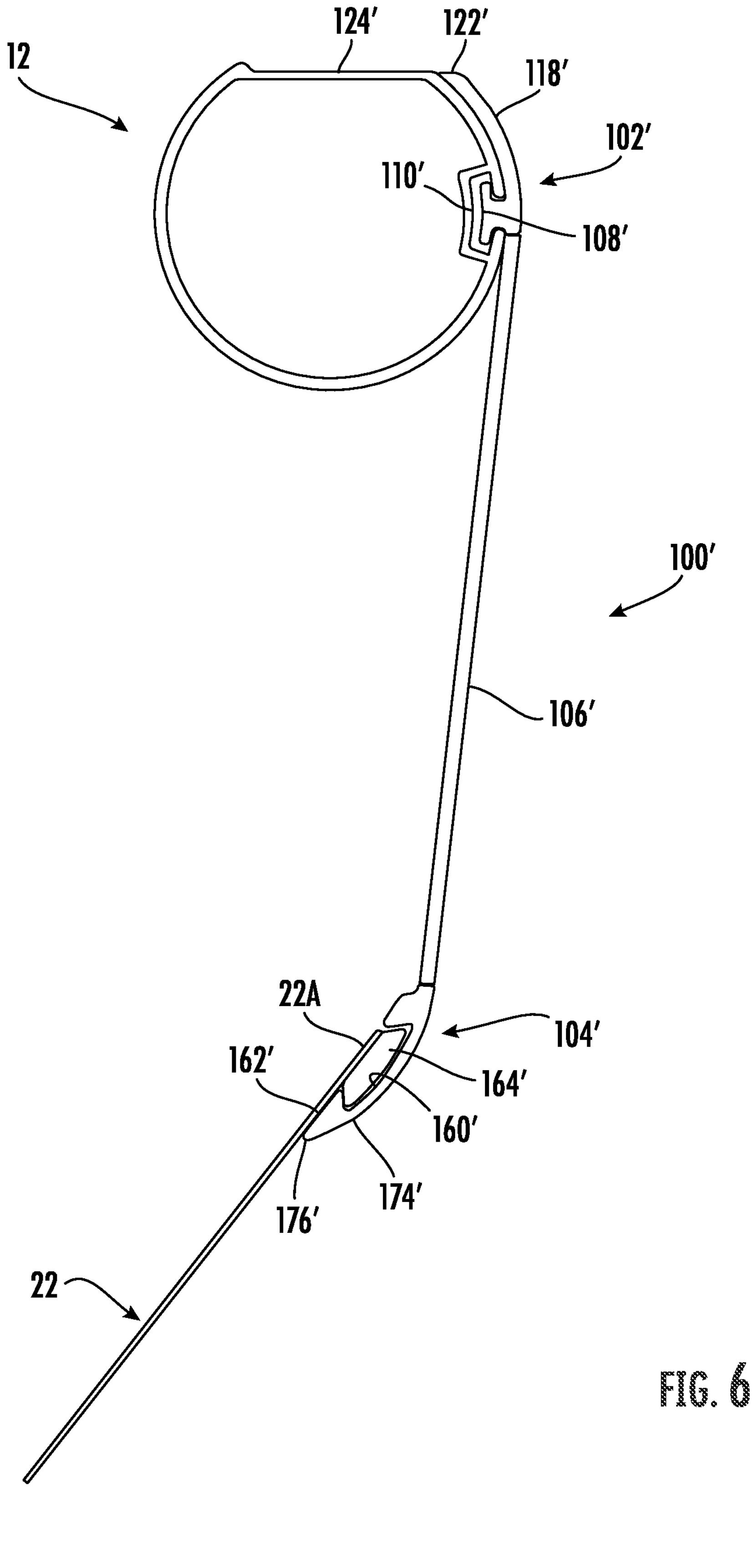
FIG. 6 illustrates another partial, cross-sectional view of the roller shade shown in FIG. 1, particularly illustrating another embodiment of a shade adapter for coupling the shade panel to the roller in accordance with aspects of the present subject matter.
Figure 7:
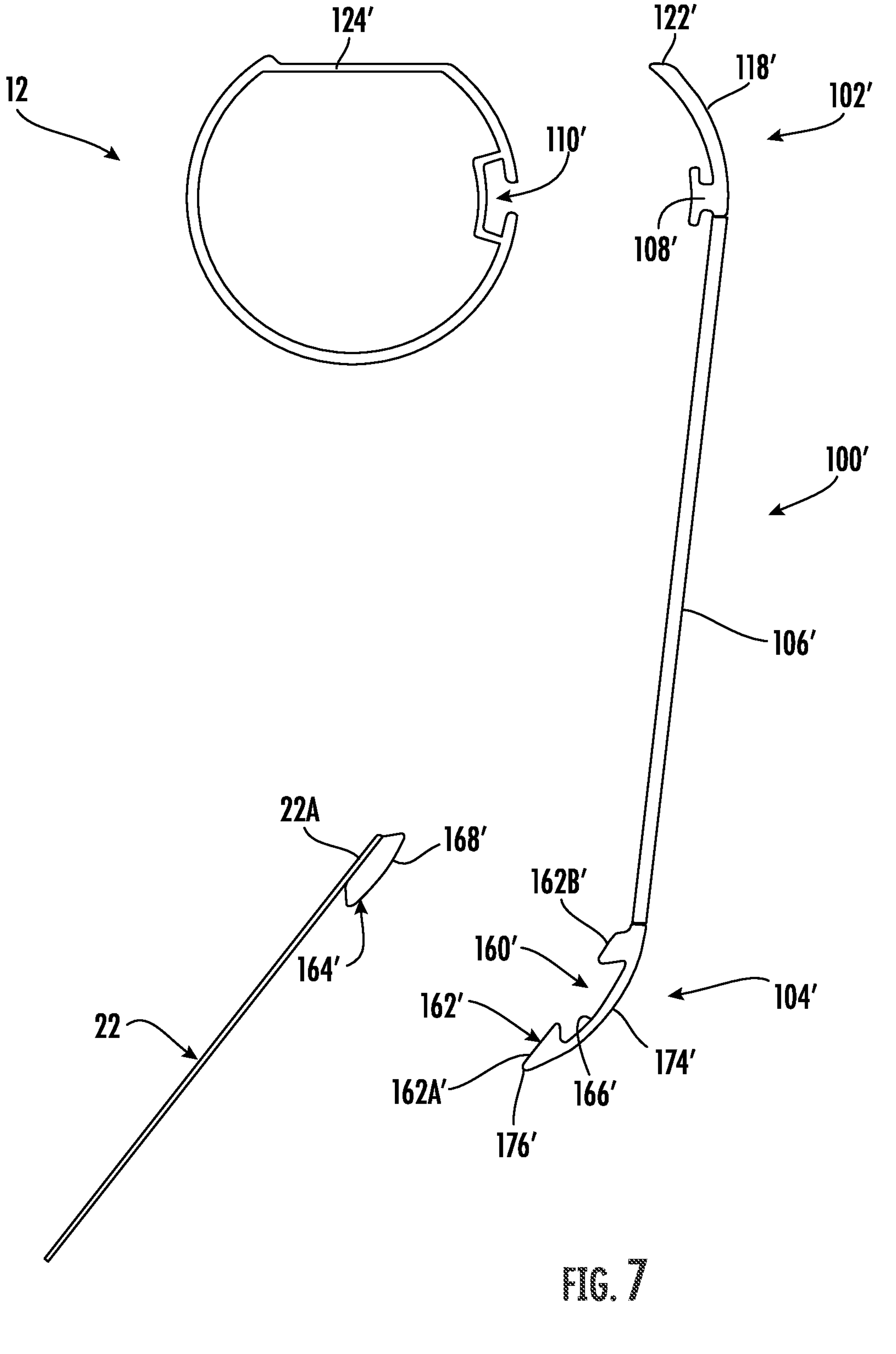
FIG. 7 illustrates an exploded view of the shade components shown in FIG. 6.

Referring now to FIGS. 6 and 7, additional partial, cross-sectional views of the roller shade 10 shown in FIG. 1 are illustrated in accordance with aspects of the present subject matter, particularly illustrating another example embodiment of a shade adapter 100' for use in coupling the shade panel 22 to the roller 12 of the roller shade 10. Specifically, FIG. 6 illustrates an assembled, cross-sectional view of the shade adapter 100' (as installed between the roller 12 and shade panel 22) in a fully unwrapped state relative to the roller 12. Additionally, FIG. 7 illustrates an exploded, cross-sectional view of the shade components shown in FIG. 6.

As shown in the illustrated embodiment, the shade adapter 100' is configured as an elongate member including a first adapter portion 102', a second adapter portion 104', and a connector panel portion 106' extending between the first and second adapter portions 102', 104', with the first adapter portion 102' configured to be coupled to the roller 12 and the second adapter portion 104' configured to be coupled to the upper end 22A of the shade panel 22. In general, the first adapter portion 102' and the connector panel portion 106' of the shade adapter 100', along with the roller 12, are configured the same as the first adapter portion 102, the connector panel portion 106, and the roller 12 of the roller shade 10 described above with reference to FIGS. 2-5. For instance, the roller 12 includes a flattened section 124' and a joint slot 110' spaced apart circumferentially from the flattened section 124', with the joint slot 110' being configured to receive a corresponding joint projection 108' of the first adapter portion 102' (e.g., a T-shaped projection) for coupling the shade adapter 100' to the roller 12. Additionally, as shown in FIGS. 6 and 7, the first adapter portion 102' includes an extension arm 118' defining a curved profile generally matching the radius of curvature of the roller 12 such that the extension arm 118' extends circumferentially along the outer circumference of the roller 12 between the roller/adapter joint location and the flattened section 124' of the roller 12, with a tip end 122' of the extension arm 118' being located generally adjacent to an edge of the flattened section 124'.

However, unlike the embodiment described above in which the second adapter portion is configured to accommodate a magnetic element(s) for forming a magnet-based connection between the shade adapter and the shade panel, the second adapter portion 104' shown in FIGS. 6 and 7 is configured to form a dovetail-type joint with the shade panel 22. Specifically, as shown in the illustrated embodiment, the second adapter portion 104' defines a joint slot 160' relative to an inner face 162' of the second adapter portion 104' that is configured to receive a correspondingly shaped shade connector 164' coupled to the upper end 22A of the shade panel 22 (e.g., via adhesives or tape). As particularly shown in FIG. 7, the joint slot 160' defines a fan or dovetail-shaped channel that expands in width or otherwise diverges as the slot 160' extends from the inner face 162' of the second adapter portion 104' to a bottom end 166' of the slot 160'. In such an embodiment, the shade connector 164' may similarly be configured to define a fan or dovetail-like shape, with the shade connector 164' expanding in width or otherwise diverging as it extends outwardly from the shade panel 22 to an outer face 168' of the shade connector 164'.

Figure 8:
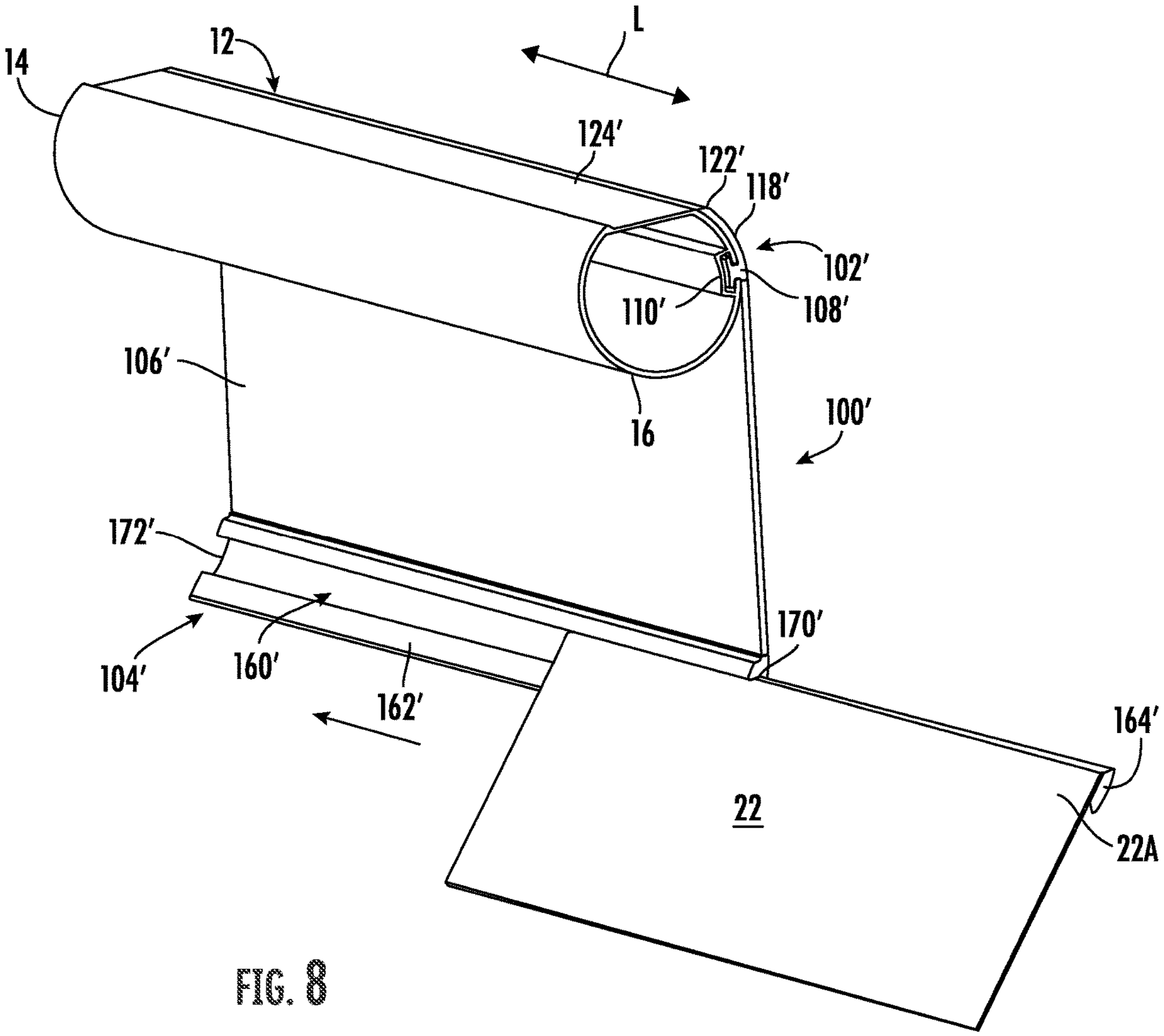
FIG. 8 illustrates a perspective view of the shade components shown in FIG. 6, with the shade panel in a partially assembled state relative to the shade adapter.

It should be appreciated that, similar to the installation method described above with reference to the dovetail-type joint provided between the first adapter portion 102' and the roller 12, the shade connector 164' may be configured to be slidably installed within the joint slot 160' defined by the second adapter portion 104'. For instance, FIG. 8 illustrates a perspective view of the roller 12, the shade adapter 100', and the portion of the shade panel 22 shown in FIG. 6, with the shade panel 22 being illustrated in a partially assembled state relative to the shade adapter 100'. Specifically, to assemble the shade panel 22 relative to the shade adapter 100', the shade connector 164' may be inserted within the joint slot 160' at one of the ends of the second adapter portion 104' (e.g., end 170' shown in FIG. 8). Thereafter, as shown in FIG. 8, the shade panel 22 may be slid laterally (e.g., in lateral direction L) relative to the shade adapter 100' until the shade panel 22 reaches the opposed end of the adapter 100' (e.g., end 172' shown in FIG. 8).

Figure 9:
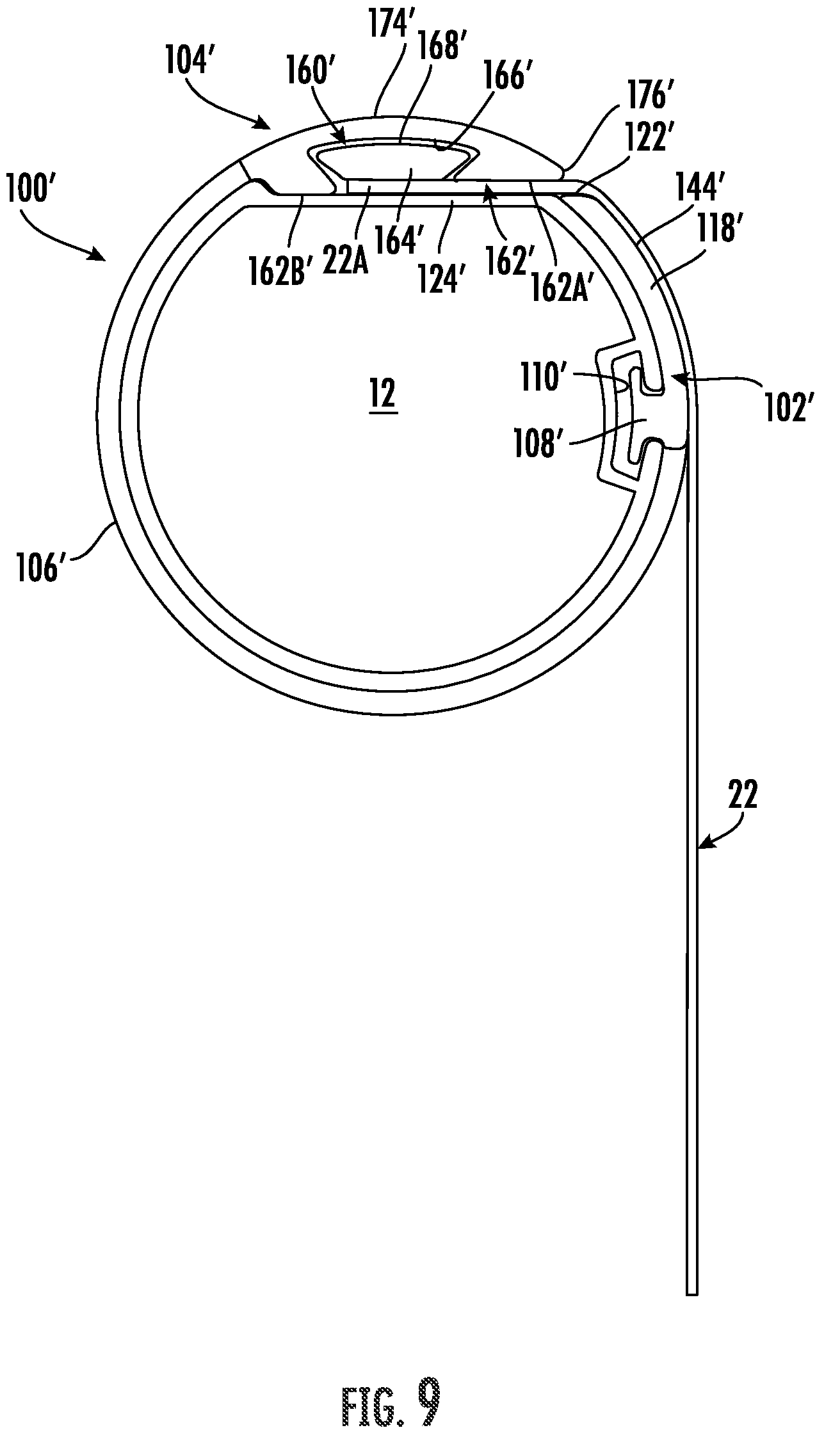
FIG. 9 illustrates another cross-sectional view of the assembled shade components shown in FIG. 6, particularly illustrating the shade adapter in a fully wrapped state relative to the roller.

It should also be appreciated that, similar to the shade adapter 100 described above, the shade adapter 100' shown in FIGS. 6-8 may be configured to form a generally circular profile when wrapped around the roller 12, thereby allowing the shade panel 22 to be wrapped around both the shade adapter 100' and the roller 12 as the shade panel 22 is being retracted without creating indentions or other dents in the wrapped panel that can lead to defects in the fabric over time. For instance, FIG. 9, illustrates another cross-sectional view of the shade components shown in FIG. 6 after the shade adapter 100' has been wrapped around the roller 12. As shown, similar to the embodiment described above, the length of the connector panel portion 106' of the shade adapter 100' may be selected such that, when the shade adapter 100' is wrapped around the roller 12, the inner face 162' of the second adapter portion 104' is seated flushed against or is otherwise positioned adjacent to the flattened section 124' of the roller 12, with an opposed outer face 174' of the second adapter portion 104' defining a curved profile that generally matches the radius of curvature of the remainder of the shade adapter 100 as wrapped around the roller 12. Moreover, as shown in FIG. 9, by configuring the extension arm 118' of the first adapter portion 102' to extend circumferentially between the roller/adapter joint and the flattened section 124' of the roller 12, the shade adapter 100 may generally wrap end-to-end substantially entirely around the outer perimeter of the roller 12, with the tip end 122' of the extension arm 118' extending up to and being positioned generally adjacent to a tip end 176' of the second adapter portion 104' disposed at the edge of the flattened section 124' of the roller 12. In such an embodiment, an outer face 144' (FIG. 9) of the first adapter portion 102' may, for instance, be configured to define a curved profile that generally matches the curved profile of the outer face 174' of the second adapter portion 104' such that the first and second adapter portions 102', 104' collectively define a common or continuous curved profile that extends across the adjacent ends 122', 176' of the adapter portions 102', 104'. As a result, when wrapped fully around the roller 12, the shade adapter 100' may define a generally continuous, circular cross-sectional profile.

It should be appreciated that, similar to embodiment described above, the inner face 162' of the second adapter portion 104' may be defined by separate face sections 162A', 162B' positioned along opposed sides of the joint slot 160'. For instance, as shown in FIG. 9, the inner face 162' may be defined by a first face section 162A' extending between the joint slot 160' and the tip end 176' of the second adapter portion 104' and a second face section 162B' extending along the opposed side of the joint slot 160'. In several embodiments, the first and second face sections 162A', 162B' may be offset from one another or otherwise not co-planar. For instance, as shown in the illustrated embodiment, the second face section 162B' is spaced apart further from the bottom end 166' of the joint slot 160' than the first face section 162A'. In such an embodiment, as shown in FIG. 9, the second face section 162B' may abut against or otherwise directly contact the flattened section 124' of the roller 12, while the first face section 162A' may be spaced apart slightly from the flattened section 124' (e.g., by a distance generally equal to the thickness of the shade panel 22) to allow the shade panel 22 to extend between the first face section 162A' and the flattened section 124'.

Figure 10:
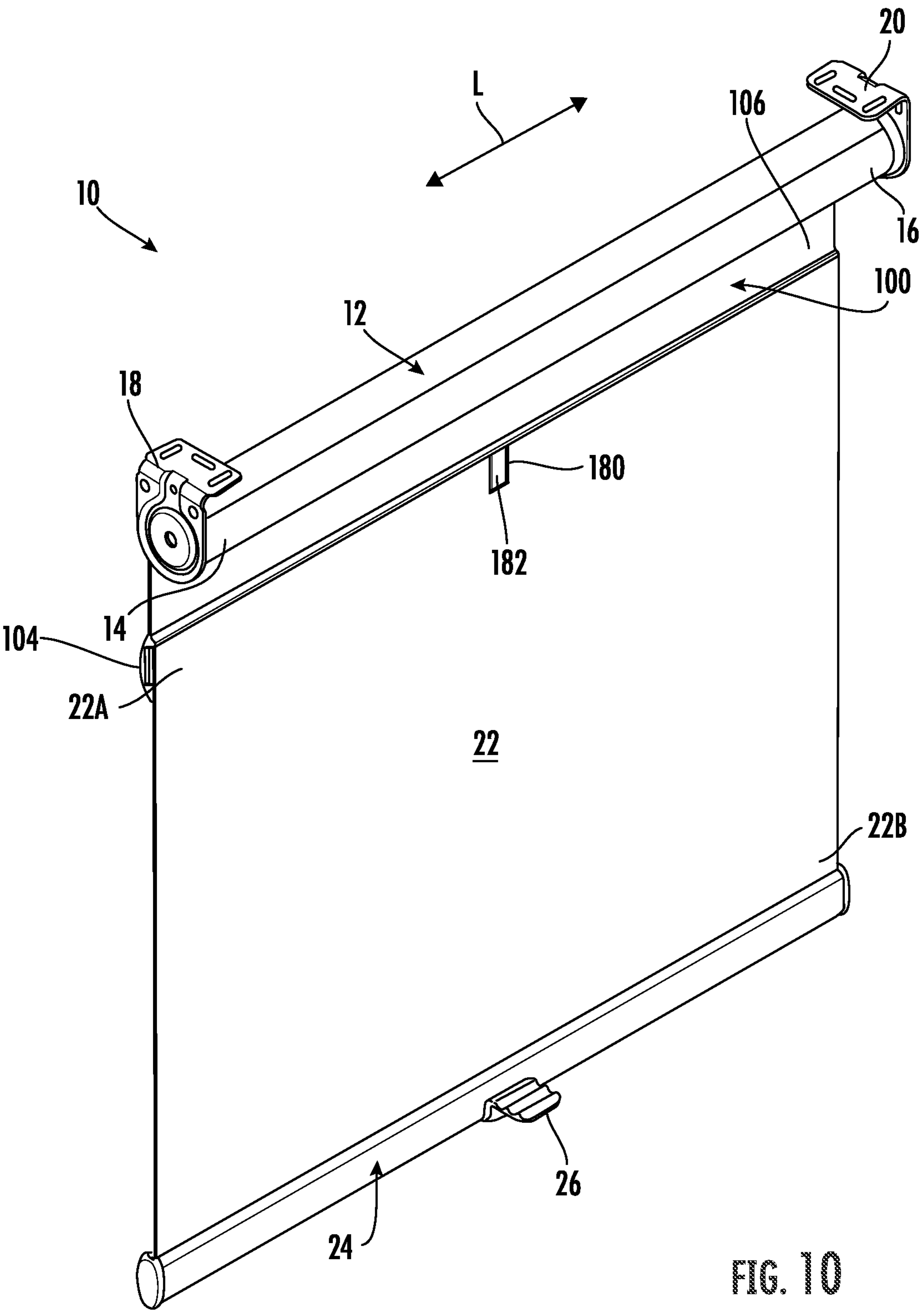
FIG. 10 illustrates a perspective view of a further embodiment of a roller shade in accordance with aspects of the present subject matter.
Figure 11:
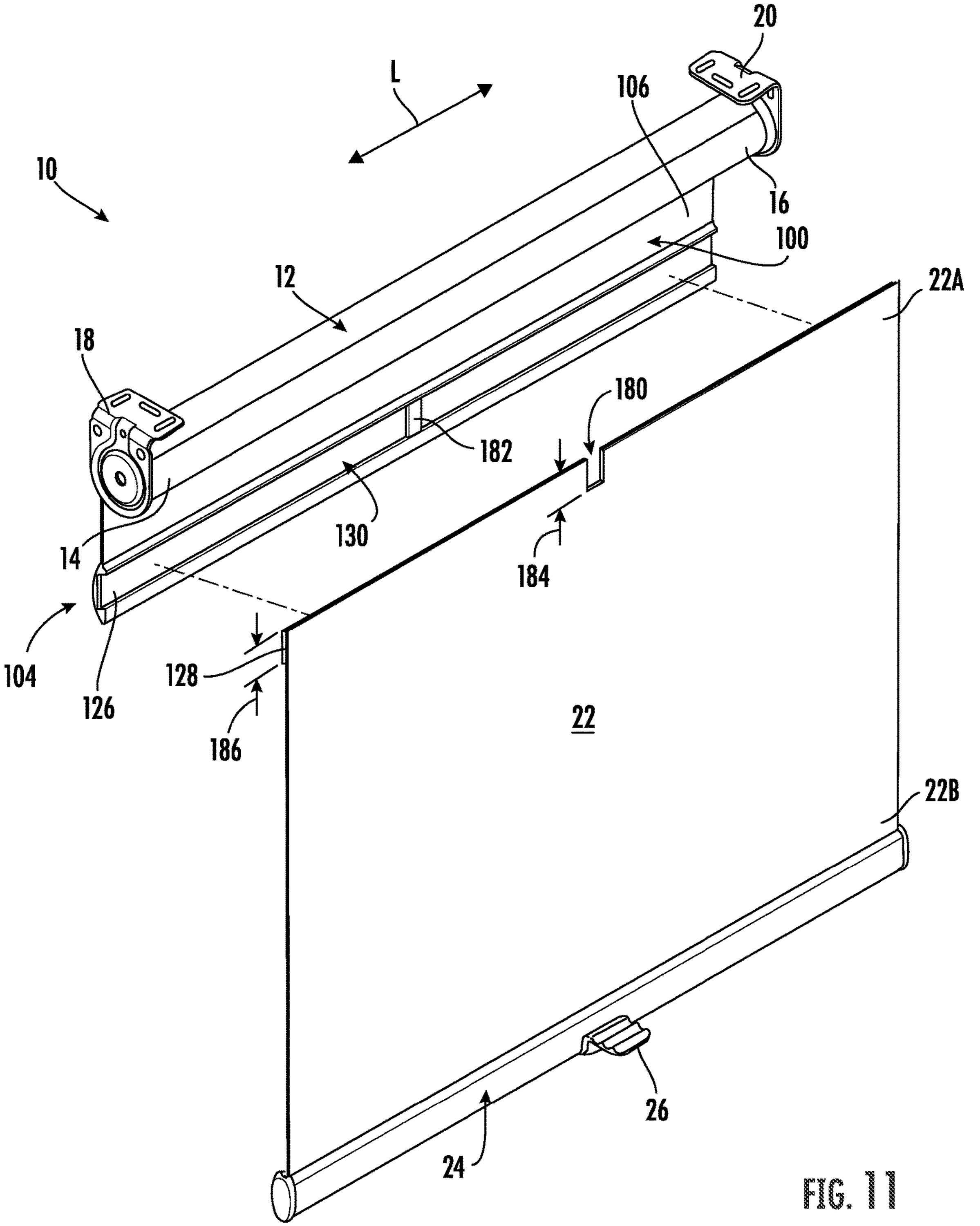
FIG. 11 illustrates an exploded view of the roller shade of FIG. 10, particularly illustrating a shade panel of the roller shade exploded away from a shade adapter of the roller shade.

Referring now to FIGS. 10 and 11, perspective views of another embodiment of the roller shade 10 shown in FIG. 1 are illustrated in accordance with aspects of the present subject matter, with FIG. 10 illustrating an assembled view of the roller shade 10 and FIG. 11 illustrating a partially exploded view of the roller shade 10 shown in FIG. 10. Except as described below, the roller shade 10 shown in FIGS. 10 and 11 is configured the same as the roller shade 10 shown and described above with reference to FIGS. 1-5, with like reference characters being used in FIGS. 10 and 11 to identify the same features shown in FIGS. 1-5.

For instance, as shown in FIGS. 10 and 11, the roller shade 10 includes a roller 12 extending between first and second ends 14, 16, with each end 14, 16 being rotatably coupled to a respective mounting bracket 18, 20 for supporting the roller shade 10 relative to the adjacent architectural structure. Additionally, the roller shade 10 includes a flexible shade panel 22 configured to be unwound from and wound around the roller 12 with rotation thereof and a bottom rail 24 coupled to a lower or bottom end 22B of the shade panel 22. Moreover, the roller shade 10 includes a shade adapter 100 configured to be coupled between the roller 12 and the shade panel 22, with the shade adapter 100 including a first end or adapter portion 102 (not shown in FIGS. 10 and 11—see FIGS. 2-5), a second end or adapter portion 104 configured to be coupled to an upper end 22A of the shade panel 22 (e.g., via one or more first magnetic elements 126 (FIG. 11) provided in operative association with the second adapter portion 104 and one or more second magnetic elements 128 (FIG. 11) provided in operative association with the upper end 22A of the shade panel 22), and a connecter panel portion 106 extending between the first and second adapter portions 102, 104. The shade adapter 100 is generally configured as described above with reference to FIGS. 2-5, with the first adapter portion 102 configured to be coupled to the roller 12 (e.g., via a dovetail-type joint) and the second adapter portion 104 defining a retention channel 130 (FIG. 11) within which the first magnetic element(s) 126 is positioned and that at least partially receives the second magnetic element(s) 128 when the magnetic elements 126, 128 are magnetically engaged with each other.

However, unlike the embodiments described above with reference to FIGS. 1-5, the roller shade 10 shown in FIGS. 10 and 11 includes lateral alignment features for aligning the shade panel 22 relative to the shade adapter 100 in the lateral direction L of the roller shade 10 when coupling the shade panel 22 to the shade adapter 100. Specifically, as shown in the illustrated embodiment, the shade panel 22 and the associated second magnetic element 128 includes or defines an alignment slot or keyway 180 (e.g., at the upper end 22A of the shade panel 22) that is configured to receive a corresponding raised feature or key 182 provided within the retention channel 130 of the second adapter portion 104 of the shade adapter 100. In such an embodiment, by aligning the keyway 180 with the key 182 of the shade adapter 100 when coupling the shade panel 22 to the shade adapter 100 (e.g., via the magnetic elements 126, 128) such that the key 182 is received within the keyway 180, it can be ensured that the shade panel 22 is properly and consistently aligned with the shade adapter 100 (i.e., in the lateral direction L of the roller shade 22). Similarly, by configuring replacement shade panels to include the same or a similar keyway 180, such replacement panels may be quickly and easily installed relative to the shade adapter 100 by simply aligning the keyway 180 with the key 182 of the shade adapter 100 so that the key 182 is received within the keyway 180 as the magnetic elements 126, 128 magnetically engage each other.

In the illustrated embodiment, the roller shade 10 includes a single pair of keyed alignment features (e.g., in the form a single key 182 and corresponding keyway 180). However, it should be appreciated that, in other embodiments, the roller shade 10 may be configured to include two or more pairs of keyed alignment features. Additionally, in the illustrated embodiment, the keyed alignment features of the roller shade 10 are positioned in a generally central position along the lateral width of the shade 10. However, in other embodiments, such features may be positioned at any other suitable location along the lateral width of the roller shade 10.

It should be also appreciated that the keyed alignment features of the roller shade 10 may generally define any suitable shape and/or may have any suitable configuration that allows such features to align in mating engagement (e.g., via the key 182 being received within the keyway 180) as the second magnetic element 128 is being at least partially received within the retention channel 130 when coupling the shade panel 22 to the shade adapter 100. For instance, the illustrated embodiment, the keyed alignment features are generally rectangular in shape, with the key 182 being configured as a rectangular block (e.g., extending outwardly from the first magnetic element 126 within the retention channel 130) and the keyway 180 being formed as a rectangular cut-out or slot formed through the shade panel 22 and the adjacent portion of the second magnetic element 128. However, in other embodiments, the keyed alignment features may have any other suitable mating shape or configuration, such as a tapered shape or profile or any other suitable shape/profile.

Moreover, as indicated above, the keyway 180 shown in FIGS. 10 and 11 is configured as a cut-out or slot formed in the upper end 22A of the shade panel 22 and the adjacent portion of the second magnetic element 128. However, in other embodiments, the keyway 180 may be defined entirely by the second magnetic element 128, with the shade panel 22 being continuous or non-slotted across the upper end 22A thereof. In such an embodiment, when the key 182 is received within the keyway 180 as the magnetic elements 126, 128 magnetically engage each other, the shade panel 22, itself, may extend across and cover the key 180 and associated keyway 182, thereby concealing the keyed connection from view. Additionally, it should be appreciated that, when the keyway 180 is formed partially (e.g., in combination with the shade panel 22) or entirely by the second magnetic element 128, such portion of the keyway 180 may be formed by a cut-out or slot formed in the second magnetic element 128 (e.g., when such magnetic element 128 is a continuous magnetic element extending across the lateral width of the shade panel 22) or as a gap or opening between adjacent or neighboring second magnetic elements 128 (e.g., when two or more magnetic elements 128 are provided at the upper end 22A of the shade panel 22).

It should also be appreciated that, in embodiments in which the second magnetic element 128 corresponds to a continuous magnetic element extending across the lateral width of the shade panel 22, it may be desirable for the keyway 180 (and associated key 182) to have a vertical dimension 184 (FIG. 11) that is less than a corresponding width 186 of the second magnetic element 128 so that a portion of such magnetic element 128 still extends continuously across the shade 22 in the lateral direction L. For instance, in one embodiment, the vertical dimension 184 of the keyway 180 (and associated key 182) may be equal to less than 75% of the width 186 of the second magnetic element 128, such as less than 50% of the width 186 of the second magnetic element 128 or less than 20% of the width 186 of the second magnetic element 128.

While the foregoing Detailed Description and drawings represent various embodiments, it will be understood that various additions, modifications, and substitutions may be made therein without departing from the spirit and scope of the present subject matter. Each example is provided by way of explanation without intent to limit the broad concepts of the present subject matter. In particular, it will be clear to those skilled in the art that principles of the present disclosure may be embodied in other forms, structures, arrangements, proportions, and with other elements, materials, and components, without departing from the spirit or essential characteristics thereof. For instance, features illustrated or described as part of one embodiment can be used with another embodiment to yield a still further embodiment. Thus, it is intended that the present subject matter covers such modifications and variations as come within the scope of the appended claims and their equivalents. One skilled in the art will appreciate that the disclosure may be used with many modifications of structure, arrangement, proportions, materials, and components and otherwise, used in the practice of the disclosure, which are particularly adapted to specific environments and operative requirements without departing from the principles of the present subject matter. For example, elements shown as integrally formed may be constructed of multiple parts or elements shown as multiple parts may be integrally formed, the operation of elements may be reversed or otherwise varied, the size or dimensions of the elements may be varied. The presently disclosed embodiments are therefore to be considered in all respects as illustrative and not restrictive, the scope of the present subject matter being indicated by the appended claims, and not limited to the foregoing description.

In the foregoing Detailed Description, it will be appreciated that the phrases "at least one", "one or more", and "and/or", as used herein, are open-ended expressions that are both conjunctive and disjunctive in operation. The term "a" or "an" element, as used herein, refers to one or more of that element. As such, the terms "a" (or "an"), "one or more" and "at least one" can be used interchangeably herein. All directional references (e.g., proximal, distal, upper, lower, upward, downward, left, right, lateral, longitudinal, front, rear, top, bottom, above, below, vertical, horizontal, crosswise, radial, axial, clockwise, counterclockwise, and/or the like) are only used for identification purposes to aid the reader's understanding of the present subject matter, and/or serve to distinguish regions of the associated elements from one another, and do not limit the associated element, particularly as to the position, orientation, or use of the present subject matter. Connection references (e.g., attached, coupled, connected, joined, secured, mounted and/or the like) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another.

All apparatuses and methods disclosed herein are examples of apparatuses and/or methods implemented in accordance with one or more principles of the present subject matter. These examples are not the only way to implement these principles but are merely examples. Thus, references to elements or structures or features in the drawings must be appreciated as references to examples of embodiments of the present subject matter, and should not be understood as limiting the disclosure to the specific elements, structures, or features illustrated. Other examples of manners of implementing the disclosed principles will occur to a person of ordinary skill in the art upon reading this disclosure.

This written description uses examples to disclose the present subject matter, including the best mode, and also to enable any person skilled in the art to practice the present subject matter, including making and using any devices or systems and performing any incorporated methods. The patentable scope of the present subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The following claims are hereby incorporated into this Detailed Description by this reference, with each claim standing on its own as a separate embodiment of the present disclosure. In the claims, the term "comprises/comprising" does not exclude the presence of other elements or steps. Furthermore, although individually listed, a plurality of means, elements or method steps may be implemented by, e.g., a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second", etc., do not preclude a plurality. Reference signs in the claims are provided merely as a clarifying example and shall not be construed as limiting the scope of the claims in any way.

What is claimed is:

1. A roller shade comprising:

a roller;

a shade panel configured to be wound around and unwound from the roller to retract and extend the shade panel, respectively;

a shade adapter coupled between the roller and the shade panel, the shade adapter comprising:

a first adapter portion configured to be coupled to the roller via a joint, the first adapter portion comprising a curved extension arm extending from the joint, the curved extension arm comprising an inner surface abutting circumferentially a portion of a surface of the roller;

a second adapter portion configured to be coupled to the shade panel, the second adapter portion defining a retention channel including opposed first and second sidewalls extending from a bottom end of the retention channel, the second adapter portion including a first magnetic element positioned between the first and second sidewalls of the retention channel, an outer face of the second adapter portion defines a curved profile that matches a curved profile of an outer face of the curved extension arm such that the first and second adapter portions define a substantially continuous curved profile across adjacent ends of the first and second adapter portions when the shade adapter is wrapped around the roller; and a connector panel portion extending between the first and second adapter portions;

wherein:

a second magnetic element is coupled to an upper end of the shade panel;

the first and second magnetic elements are configured to magnetically engage each other to couple the shade adapter to the shade panel;

the second magnetic element is at least partially received within the retention channel when the first and second magnetic elements are magnetically engaged with each other;

the retention channel is configured such that the second magnetic element is captured between the first and second sidewalls of the retention channel to allow for alignment between the shade adapter and the shade panel in a vertical direction of the roller shade; and when the shade adapter is wrapped around the roller, the upper end of the shade panel is positioned between the roller and the second adapter portion and the shade panel extends outwardly therefrom between a gap defined between the adjacent ends of the first and second adapter portions.

2. The roller shade of claim 1, wherein:

the retention channel is defined between an inner face of the second adapter portion and a bottom wall of the retention channel defining the bottom end of the retention channel; and the first magnetic element is recessed relative to the inner face of the second adapter portion within the retention channel.

3. The roller shade of claim 2, wherein:

the roller includes a flattened roller section that is recessed relative to a circular profile of the roller; and the inner face of the second adapter portion is configured to be circumferentially aligned with the flattened roller section when the shade adapter is wrapped around the roller.

4. The roller shade of claim 3, wherein the roller includes a detent formed at a transition location at which the circular profile of the roller transitions into the flattened roller section, a portion of the second shade adapter portion being configured to engage with the detent when the shade adapter is wrapped around the roller.

5. The roller shade of claim 1, wherein the shade adapter comprises a key positioned within the retention channel and a keyway is defined by at least one of the second magnetic element or the shade panel, the key being configured to be received within the keyway when the shade adapter is coupled to the shade panel to allow for alignment between the shade adapter and the shade panel in a lateral direction of the roller shade.

6. The roller shade of claim 1, wherein the shade adapter comprises a key provided in operative association with the second adapter portion and a keyway is defined by at least one of the second magnetic element or the shade panel, the key being configured to be received within the keyway when the shade adapter is coupled to the shade panel to allow for alignment between the shade adapter and the shade panel in a lateral direction of the roller shade.

7. The roller shade of claim 1, wherein the first adapter portion is configured to form a dovetail-type joint with the roller.

8. The roller shade of claim 1, wherein:

the first adapter portion is coupled to the roller at a joint location;

the curved extension arm extends from the joint location in a direction opposite an interface defined between the first adapter portion and the connector panel portion such that the curved extension arm extends circumferentially around the portion of the roller.

9. The roller shade of claim 8, wherein:

the roller includes a flattened roller section that is recessed relative to a circular profile of the roller; and the curved extension arm extends circumferentially around the roller between the joint location and the flattened roller section.

10. A roller shade comprising:

a roller;

a shade panel configured to be wound around and unwound from the roller to retract and extend the shade panel, respectively;

a shade adapter coupled between the roller and the shade panel, the shade adapter comprising:

a first adapter portion configured to be coupled to the roller at a joint location;

a second adapter portion configured to be coupled to an upper end of the shade panel; and a connector panel portion extending between the first and second adapter portions;

wherein:

the first adapter portion comprises a curved extension arm extending from the joint location in a direction opposite an interface defined between the first adapter portion and the connector panel portion, the curved extension arm comprising an inner surface that abuts circumferentially a portion of a surface of the roller, and the curved extension arm terminates at the tip end that is positioned along an outer perimeter of the roller at a location spaced apart from the joint location; and the second adapter portion comprises an outer face defining a curved profile that matches a curved profile of an outer face of the curved extension arm such that the first and second adapter portions define a substantially continuous curved profile across adjacent ends of the first and second adapter portions when the shade adapter is wrapped around the roller; and when the shade adapter is wrapped around the roller, the upper end of the shade panel is positioned between the roller and the second adapter portion and the shade panel extends outwardly therefrom between a gap defined between the adjacent ends of the first and second adapter portions.

11. The roller shade of claim 10, wherein:

the roller includes a flattened roller section defined along the outer perimeter of the roller that is recessed relative to a circular profile of the roller; and the curved extension arm extends circumferentially along the outer perimeter of the roller between the joint location and the flattened roller section.

12. The roller shade of claim 11, wherein:

the second adapter portion is configured to be circumferentially aligned with the flattened roller section of the roller when the shade adapter is wrapped around the roller.

13. The roller shade of claim 10, wherein the first adapter portion is configured to form a dovetail-type joint with the roller.

14. The roller shade of claim 13, wherein the second adapter portion is configured to be magnetically coupled to the roller shade.

15. The roller shade of claim 14, wherein:

the second adapter portion includes a first magnetic element coupled thereto;

a second magnetic element is coupled to a portion of the shade panel; and the first and second magnetic elements are configured to magnetically engage each other to couple the shade adapter to the shade panel.

16. The roller shade of claim 15, wherein the shade adapter comprises a key provided in operative association with the second adapter portion and a keyway is defined by at least one of the second magnetic element or the shade panel, the key being configured to be received within the keyway when the shade adapter is coupled to the shade panel.

17. The roller shade of claim 15, wherein:

the second adapter portion defines a retention channel;

the first magnetic element is positioned within the retention channel; and the second magnetic element is at least partially received within the retention channel when the first and second magnetic elements are magnetically engaged with each other.

* * * * *